July 9, 1957
J. S. WOJCIK
2,798,929
CONTROL APPARATUS
Filed Jan. 4, 1952
3 Sheets-Sheet 1
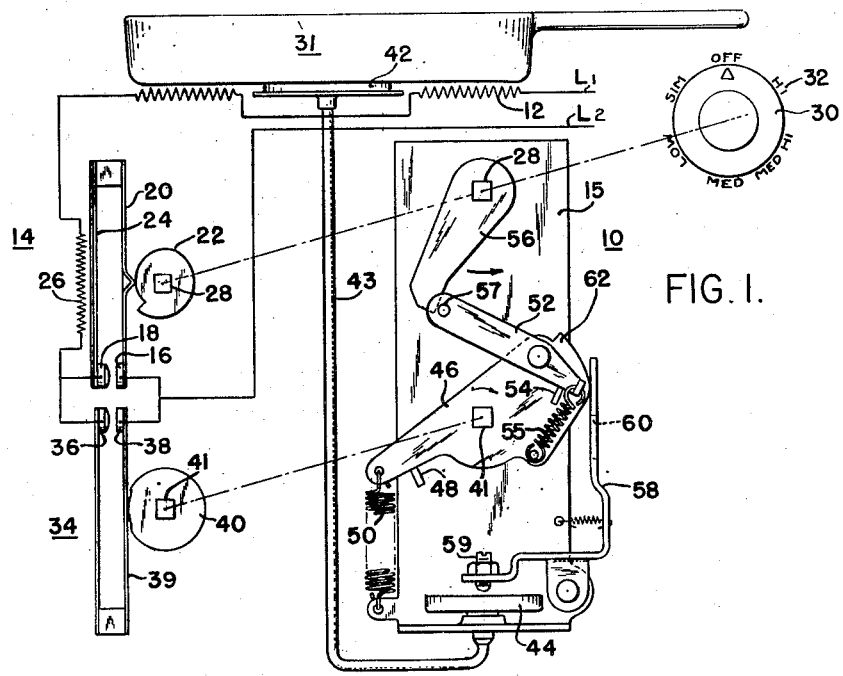
FIG. 1.
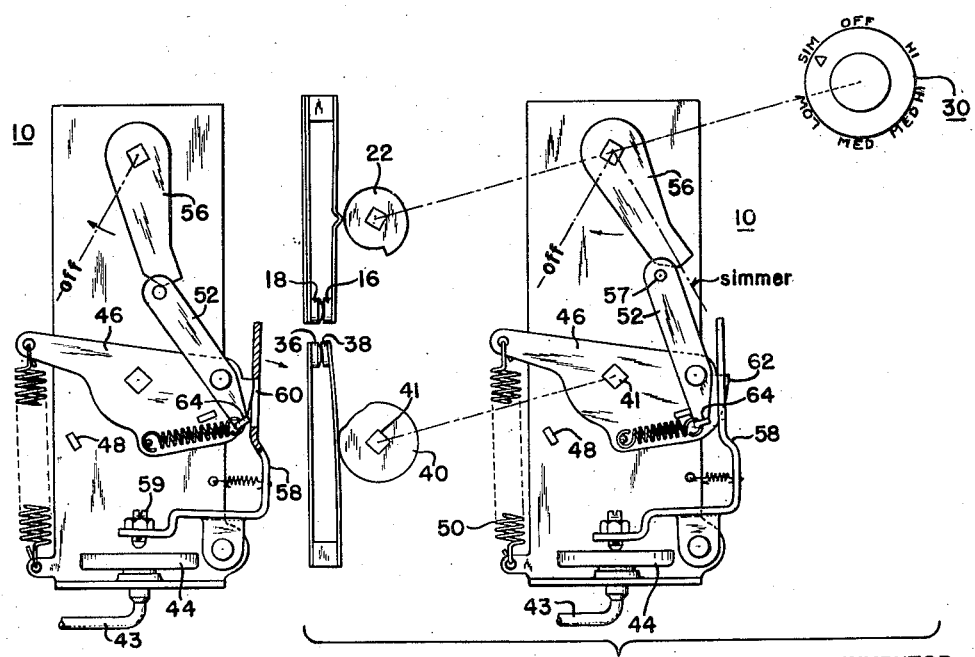
FIG. 3.
FIG. 2.
INVENTOR
JOSEPH S. WOJCIK
BY R. J. Eisinger
ATTORNEY July 9, 1957  J. S. WOJCIK  2,798,929
CONTROL APPARATUS
Filed Jan. 4, 1952  3 Sheets-Sheet 2
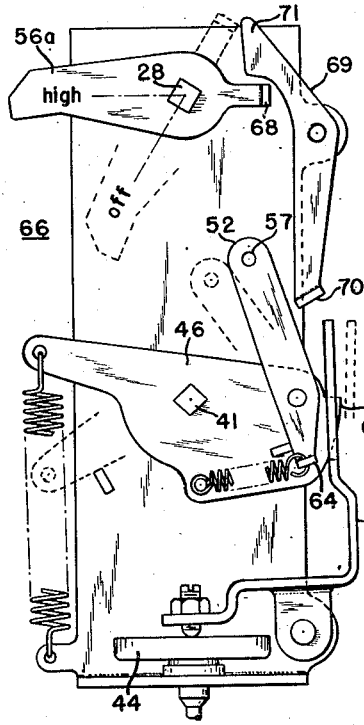
FIG. 4.
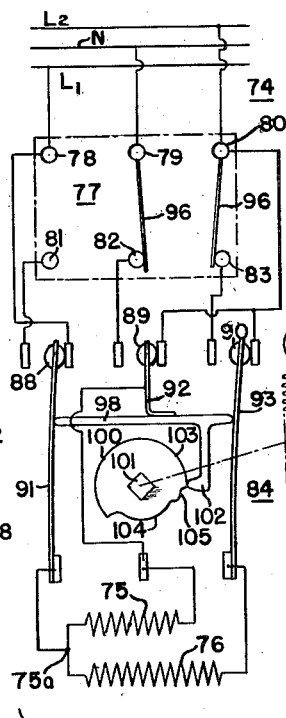
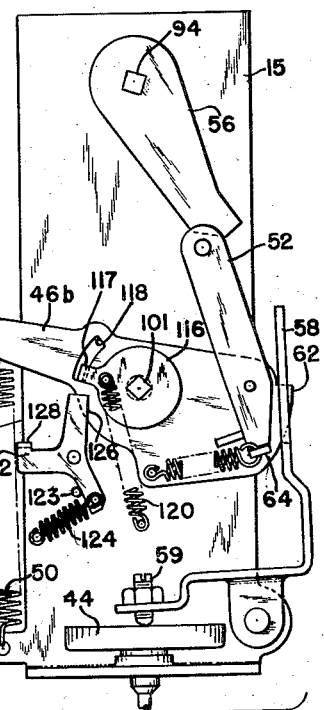
FIG. 5.
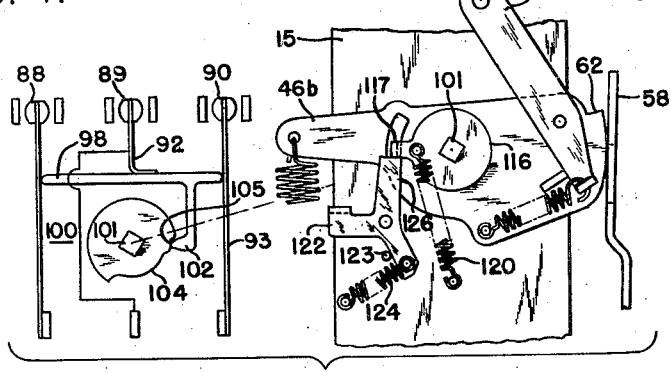
FIG. 6.
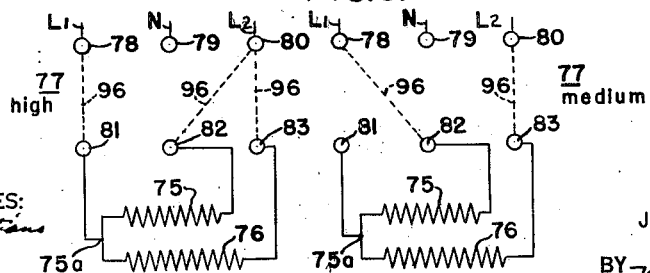
FIG. 9.   FIG. 10.
WITNESSES:
INVENTOR
JOSEPH S. WOJCIK
BY
ATTORNEY July 9, 1957
J. S. WOJCIK
2,798,929
CONTROL APPARATUS
Filed Jan. 4, 1952
3 Sheets-Sheet 3
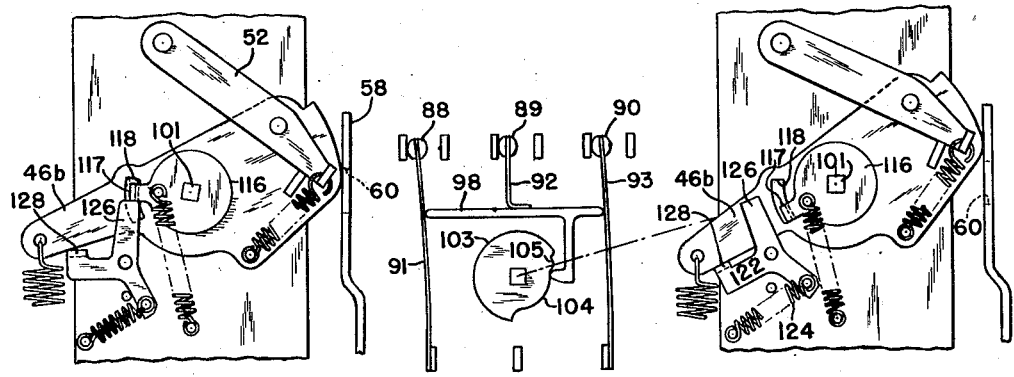
FIG. 7.
FIG. 8.
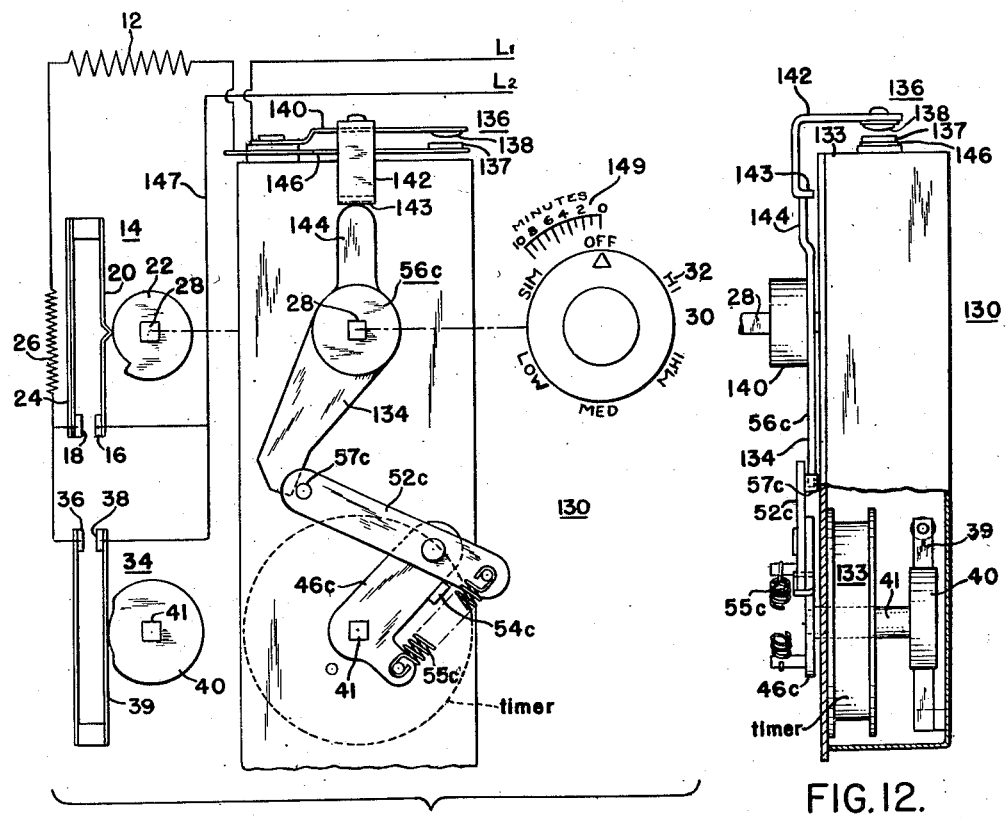
FIG. 11.
FIG. 12.
WITNESSES:
Frank Castrano
E. H. Lutz
INVENTOR
JOSEPH S. WOJCIK
BY R. J. Eisinger
ATTORNEY

United States Patent Office 2,798,929
Patented July 9, 1957

2,798,929
CONTROL APPARATUS

Joseph S. Wojcik, Mansfield, Ohio, assignor to Westinghouse Electric Corporation, East Pittsburgh, Pa., a corporation of Pennsylvania Application January 4, 1952, Serial No. 265,028

14 Claims. (Cl. 219—20)

This invention relates to a control mechanism for regulating the heat output of an electrical heating element, more particularly a surface unit of an electric range. It relates more particularly to a control which may be initially set to provide a period of high heat and then automatically to reduce the heat to a preselected wattage.

At the present time, it is the usual practice, during a cooking process, first to adjust the heat output to the maximum value in order quickly to raise the temperature of the food to the desired cooking temperature. When such temperature is reached, the heat output is reduced by manual adjustment to the desired wattage in order to prevent violent boiling of liquids or scorching of solid foods. This makes it necessary for the user to remain in the vicinity of the range in order manually to reduce the wattage.

An object of the invention is to provide a control mechanism for an electric surface unit, which mechanism is provided with a single knob which may be initially set to initiate a period of high heat and then automatically to initiate a lower heat at a preselected wattage.

Another object of the invention is to provide a control mechanism of the type outlined above, having an arrangement actuated by a single knob, for permitting the operator to omit the initial high heat period entirely, to terminate it at will or to initiate it any time during a cooking process.

A further object is to provide a control mechanism of the type outlined above, having a preheat switch and a wattage control switch operable by a single knob and having an improved connecting linkage arrangement between the switches and the knob.

In accordance with the objects of the invention, I provide a control mechanism having a single manipulating knob arranged to operate one or both of two switches, depending upon the direction and extent of rotation of the knob. The first switch, which will be termed the wattage control switch, is connected directly to the knob. This switch may be of any suitable type, such as a circuit selector switch or an infinitely adjustable wattage switch. Rotation of the knob in either direction will actuate the wattage control switch to connect a surface heating unit to a source of supply in any one of a plurality of heat settings.

The second switch, which will be termed a preheat switch, is connected in parallel with the first switch and is actuated to "on" by rotation of the knob in one direction. The preheat switch is a two-position switch and is operable by a linkage connected to the manipulating knob to connect the surface heating unit to the source of supply for maximum wattage output. The preheat switch, although manually adjustable to the "on" position, is automatically tripped to the "off" position at the end of the preheat period. The preheat period may be either a function of time in which case the preheat switch is tripped by a timer, or it may be a function of temperature in which case the preheat switch is tripped by a thermally responsive member.

In one embodiment of the control mechanism described above, the wattage control switch may be adjusted to control the surface heating unit immediately at a selected wattage output by rotating the knob in one given direction. However, if it is desired to utilize the preheating feature, the knob is rotated through a small arc in the other direction to set the preheat switch and then rotated further in the said other direction to actuate the wattage control switch to a preselected secondary or lower heat.

With this arrangement the cooking process may be conducted without further manipulation of the control after the initial setting, since the surface heating unit is energized at maximum wattage output until the cooking process attains its cooking temperature, whereupon the preheat switch is automatically tripped to the "off" position and the wattage control switch assumes control to maintain the desired wattage output for continuing the cooking process.

These and other objects are effected by my invention as will be apparent from the following description and claims taken in connection with the accompanying drawings, forming a part of this application, in which:

Fig. 1 is a somewhat schematic view of one form of control mechanism in accordance with my invention, the control being shown in the "off" position;

Fig. 2 is a view similar to Fig. 1, but showing the control in the preheat position;

Fig. 3 is a view similar to Fig. 2, but showing the control in the manual trip position of the preheat switch;

Fig. 4 shows a modification of the control shown in Figs. 1 to 3, inclusive;

Fig. 5 shows another modification of my improved control having a circuit selector switch incorporated therein;

Figs. 6, 7 and 8 are views (with portions cut away for clarity) showing the control illustrated in Fig. 5, in different operating positions;

Figs. 9 and 10 are schematic diagrams showing a selector switch and a surface unit in different wattage output arrangements;

Fig. 11 is a partly schematic view showing a further modification of my improved control having a time-controlled preheat switch incorporated therein; and Fig. 12 is a side elevation of the control shown in Fig. 11, parts having been cut away for clarity.

Figs. 1, 2 and 3

Referring to the drawings in detail, especially Figs. 1, 2 and 3 which show one embodiment of my invention, there is shown a control mechanism 10 for controlling the wattage output of a surface heating unit 12. The control includes a cycling switch 14 of the infinitely adjustable wattage control type disposed within a housing 15 and having a set of mating contacts including an adjustable contact 16 and a cycling contact 18. The adjustable contact 16 is carried by a flexible current carrying arm 20 which is biased towards and adjustable by a manually rotatable cam 22, to an infinite number of positions within the limits of the throw of the cam. The cycling contact 18 is carried by a bimetal arm 24 disposed adjacent a small electrical heater 26. The cam 22 is keyed to a shaft 28 which in turn is keyed to and actuated by a manually rotatable knob 30.

The surface heating unit 12, the small heater 26 and the contacts 18 and 16 are connected in series with each other across a power supply $L_1$—$L_2$. Thus, when the contacts 16 and 18 are in engagement with each other, current will flow through the above circuit and the wattage output of the surface unit will enable a cooking operation to be conducted in a cooking vessel 31 supported thereon. The heater 26 will also be energized by the same current and its wattage output, although small, will heat the bimetal 24, causing it to warp in the direction to move the cycling contact 18 out of engagement with the adjustable contact 16. On disengagement of the contacts, the circuit through the surface unit 12 and the heater 26 is interrupted. The bimetal 24 will cool and move in the opposite direction until the cycling contact 18 reengages the contact 16 and restores the circuit. This cycle is repeated for any particular setting of the cam, thereby intermittently energizing the surface unit 12. The period of contact engagement is adjustable in an infinite number of steps from "off" to "high" although only six positions are indicated by the indicia 32 disposed around the knob 30. When the knob is rotated to a desired heat setting, the cam 22 is rotated accordingly to properly position the adjustable contact 16 with respect to the cycling contact 18. As shown in Fig. 1, the knob is in the "off" position and the low part of the cam 22 is ineffective to move contact 16 into engagement with the cycling contact 18. In Fig. 2, the knob is shown in the "simmer" position and the cam 22 is effective to move the contact 16 into engagement with the cycling contact 18 at a position to the left of that shown in Fig. 1. When the knob 30 is adjusted to a higher heat setting, the cam is rotated proportionately to a position of greater throw, thereby moving the adjustable contact into engagement with the cycling contact at a position further to the left than the "simmer" position. At such a setting, the bimetal must warp to the left a greater amount before the contacts are separated, and since the bimetal warping is proportionate to the heat received from the heater 26, the "on" period is increased.

A second switch 34, which will hereinafter be termed a preheat switch, is provided for connecting the surface heating unit 12 across wires $L_1$—$L_2$ in maximum wattage output relation. The preheat switch 34 is also disposed in the housing 15 and is provided with a set of contacts including a stationary contact 36 and a movable contact 38. The movable contact 38 is carried by a spring arm 39, biased to the right and in constant abutment with a rotatable cam 40. The cam 40 is keyed to a shaft 41 and is rotatable thereby to move contact 38 into engagement with contact 36. The contacts 36 and 38, when in engagement, provide a parallel circuit which shunts the contacts 16 and 18, and effects continuous energization of the heater 26 and the surface unit 12. Although the heater 26 is energized and the contacts 16 and 18 are disengaged, they are ineffective to interrupt the circuit as long as contacts 36 and 38 are in engagement.

As shown in Fig. 1, there is provided a liquid filled thermostatic system having a chamber 42 disposed centrally of the surface unit 12 and connected by a capillary tube 43 to an expansible diaphragm 44, disposed on the control 10. The chamber 42 is positioned to contact the bottom of the vessel 31, whereby it is heated by the vessel with resulting expansion of the liquid and distention of the diaphragm 44, as well understood in the art.

The shaft 41 of the preheat switch 34 extends through the housing 15 and is keyed to a lever 46 which is biased by a helical spring 50 in counterclockwise direction against a stop member 48. A second lever 52 is pivotally mounted intermediate its ends on the lever 46 and is biased by a helical spring 55 in clockwise direction against a stop lug 54.

The shaft 28 of the cycling switch 14 also extends through the housing 15 and is keyed to an arm 56, which is disposed in a manner and is of a length to cross the arc of travel of a pin 57 fixed to the end of the lever 52, when the knob 30 is rotated counterclockwise from "off" to "simmer" (see Figs. 1 and 2); thus, the arm 56 will bear against the pin 57 for a portion of its travel and move the lever 52 and its associated lever 46 clockwise through an angle of approximately 45°. An L-shaped latching lever 58 is pivotally mounted on the housing 15 and has an adjustable abutment screw 59 mounted at one end adjacent the diaphragm 44, and a slot 60 at its other end. The L-shaped lever 58 is biased counterclockwise into abutment with the lever 46 and the slot 60 is so arranged that when the lever 46 is rotated clockwise as mentioned above, the slot will register with a detent 62 provided in the lever 46. The detent 62 will enter the slot 60 and bear against the upper edge of the slot, thereby holding the lever 46 against the bias of the spring 50. In this position, the preheat contacts 36 and 38 are held in engagement by the action of the cam 40 against the flexible arm 39.

The detent 62 may be released manually from engagement with the slot 60 by rotation of the knob 30 in clockwise direction through the arc described by "simmer" and "off" or it may be released automatically by distention of the diaphragm 44 against the abutment screw 59, as will be presently described in greater detail. When the detent is released, the lever 46 will be returned to the position shown in Fig. 1, in which the preheat contacts 36 and 38 are disengaged, and control is transferred to the cycling switch 14.

*Operation—Figs. 1 to 3*

To inaugurate a preheat period in the control mechanism 10, the knob 30 is rotated counterclockwise from the "off" to the "simmer" position. The arm 56 will be rotated into abutment with the pin 57 and move the lever 52 to the right, which movement will cause the lever 46 to rotate clockwise to the latched position shown in Fig. 2. The arm 56 and the pin 57 move along different arcs of travel, and the arm 56 is of such a length that it will move out of the arc of travel of the pin 57, immediately prior to rotation of the knob to the "simmer" position. The cam 40 is rotated clockwise, moving the preheat contact 38 into engagement with the contact 36, thereby initiating a continuous circuit through the heater 26 and the surface unit 12.

The cycling switch 14 may be preset to any desired position from "simmer" to "high" without disturbing the preheat switch 34, by rotating the knob counterclockwise to the position desired. As shown in Fig. 2, the infinite control switch is set to the "simmer" position.

As the contents of the vessel 31 attain their proper cooking temperature (for example, boiling in the case of liquids), the chamber 42 will be heated accordingly, and the resulting distension of the diaphragm 44 will move the lever 58 clockwise and release the detent 62. The spring 50 will cause the lever 46 to move counterclockwise, rotating the shaft 41 and the cam 40 and separating the preheat contacts 36 and 38 with a rapid action. Thereafter, the cycling switch 14 will assume control to provide "simmer" heat to the vessel 31 until the cooking operation is terminated by rotating the knob manually to the "off" position.

If desired, the preheat period may be omitted and the cycling switch alone may be set to provide a desired heat output. To omit the preheat period, the knob is rotated clockwise from the "off" position to the desired heat setting. In the event that the knob is rotated clockwise to "off," as for example, to terminate a cooking process, the resulting clockwise movement of the arm 56 will cause the latter to strike the pin 57, causing the lever 52 to yield against the bias of spring 55 and permit the passage of the arm 56. Thus, clockwise movement of the knob 30 is ineffective to latch the lever 46 and the preheat switch contacts 36 and 38 will remain in disengaged position.

The preheat period may be initiated at any time desired during the normal cooking operation, provided the vessel 31 is not at or above the cooking temperature, by rotating the knob 30 counterclockwise through the arc defined by "off" and "simmer," as previously described.

Also, as shown in Fig. 3, the preheat period may be manually terminated at any time desired by rotating the knob clockwise to the "off" position. As the knob passes through the arc of travel defined by the "simmer" and "off" positions, the arm 56 will strike the pin 57 and move the lever 52 counterclockwise. The lever 52 is provided with a lug 64 which will be brought to bear against the lever 58, by such rotation, causing the lever to move to the right and disengage the detent 62. The lever 46 will then be moved counterclockwise into abutment with the stop 48 by the spring 50.

*Fig. 4*

Fig. 4 shows a control mechanism 66 which may be identical to the control mechanism 10 but is provided with a tripping linkage for manually tripping the preheat switch 34 upon rotation of the knob in either direction to "off." In this connection, an arm 56a keyed to the cycling switch shaft 28, is provided with an oppositely disposed finger 68. There is provided a pivotally mounted intermediate lever 69, so proportioned that it will normally be positioned by gravity with its lower end portion 70 disposed adjacent the lever 52, while its upper end portion 71 is disposed in the arc of travel of the finger 68. The finger 68 is bent forwardly to abut the end portion 71, while the lower end portion 70 is bent forwardly to abut the lever 52.

The control mechanism 66 is shown with the preheat switch 34 latched in the "on" position and the cycling switch 14 in the "high" position, this setting having been attained by rotating the arm 56a counterclockwise from its dotted position to the position shown in full lines.

*Operation—Fig. 4*

In Fig. 4, the solid lines represent the positions of the levers in the "high" position with the preheat switch in the "on" position, while the dotted lines represent the positions of the levers in the "off" position. The preheat switch 34 (not shown) is actuated, as explained in connection with the control mechanism 10, by rotating the arm 56a counterclockwise from "off" to "simmer." However, when the arm 56a is moved counterclockwise from "high" to "off," the preheat switch 34 moves to open circuit position by the following action. The finger 68 strikes the end portion 71 of the lever 69 and rocks the lever 69 clockwise, causing its lower end portion 70 to strike and move the lever 52 counterclockwise. The lug 64 on lever 52 moves the lever 58 to the right, releasing the detent 62 and permitting the lever 46 to move to the "off" position.

The preheat switch 34 may also be manually tripped to open circuit position by clockwise rotation of the arm 56a to the "off" position, as previously described.

Thus, when the arm 56a of the control mechanism 66 is rotated to the "off" position in either clockwise or counterclockwise direction, the cycling switch 14 and the preheat switch 34 are opened and the surface cooking unit 12 is deenergized.

*Figs. 5 to 10*

Fig. 5 shows a third embodiment of the invention incorporated in a control mechanism 74 which is desirable for controlling the wattage output of a surface cooking unit having a plurality of heating elements 75 and 76 connectible across a power supply in various circuit connections.

The power supply may be of the single-phase Edison circuit type having three wires $L_1$, N, $L_2$ and in which the voltage across the wires $L_1$—$L_2$ is preferably 230 volts and the voltage across $L_1$—N and $L_2$—N is 115 volts. The heating elements may have a permanently connected common terminal 75a.

The control mechanism 74 includes a circuit selector switch 77 having line terminals 78, 79 and 80 connected, respectively, to $L_1$, N and $L_2$, and load terminals 81, 82 and 83 connectible to the heating elements 75 and 76 through a preheat switch 84.

The preheat switch 84 is provided with a plurality of double contacts 88, 89 and 90 carried, respectively, on flexible current carrying switch arms 91, 92 and 93 having their opposite ends connected to the heating elements 75 and 76. The switch arms are movable in unison and when moved to the right, as shown in Fig. 5, they engage a set of contacts connected to the line terminals 78 and 80; thereby bypassing the circuit selector switch 77 and connecting the heating elements 75 and 76 in parallel across wires $L_1$ and $L_2$ in a high wattage arrangement for preheating. When the switch arms 91, 92 and 93 are moved to the left, they engage a set of contacts connected to the load terminals 81, 82 and 83, and the circuit to the heating elements 75 and 76 is placed under the control of the circuit selector switch 77.

The selector switch 77 may be of any desired type, and is adjustable by a rotatable shaft 94 to a plurality of positions shown in Fig. 1 by the indicia 32. As is well understood, the switch 77 is provided with a plurality of switch arms 96 which are movable by the shaft 94 to connect the load terminals 81, 82 and 83 to the line terminals 78, 79 and 80 in various relations and thereby to connect the heating elements 75 and 76 to the power supply $L_1$ and $L_2$ in various circuit connections providing various wattage outputs.

As shown in Fig. 5, the preheat switch 84 is in the "on" position and the selector switch is in the "simmer" position. After the preheat switch 84 relinquishes control and its switch arms engage the contacts of the load terminals to place the selector switch 77 in control, as previously described, the heating elements 75 and 76 are connected in series with each other across wires $L_2$ and N to provide "simmer" heat, shown in Fig. 5.

Other settings of the selector switch 77 are shown diagrammatically in Figs. 9 and 10. These diagrams do not include the preheat switch 84 and have been inserted to more fully characterize the selector switch. In Fig. 9, the selector switch is set in the "high" position and the switch arms 96 are so positioned that the common terminal 75a is connected to wire $L_1$ and the other terminals are connected to wire $L_2$. Thus, the two heating elements are connected in parallel across the high voltage wires $L_1$—$L_2$.

In Fig. 10, the selector switch is set in the "medium" position and the switch arms 96 are positioned to connect the two heating elements in a series circuit across wires $L_1$—$L_2$. Other circuit connections may provide different wattages as is already well known in the art.

The switch arms 91, 92 and 93 of the preheat switch 84 are movable in unison by a reciprocating bar 98 of insulating material, reciprocable by a cam 100 keyed to a rotatable shaft 101 and jointly rotatable therewith. The bar is provided with a depending follower portion 102 which abuts the surface of the cam and acts to position the bar in accordance with the position on the cam. The cam is provided with a portion 103 of maximum throw, a portion 104 of minimum throw and an intermediate portion 105 of intermediate throw.

Counterclockwise rotation of the cam 100 will first bring the intermediate throw portion 105 into engagement with the follower 102, as shown in Fig. 6, in which position the movable contacts 88, 89 and 90 are moved to the left to an intermediate position in which they are out of engagement with both sets of contacts and the terminals of the heating elements are open circuited. Further counterclockwise rotation of the cam will move the minimum throw portion 104 into engagement with the follower 102, as shown in Fig. 8, in which position the movable contacts 88, 89 and 90 are moved to their extreme left position in which they engage the contacts connected to load terminals 81, 82 and 83, respectively, of the selector switch 77. In this position, the selector switch is effective to control the wattage of the heating elements as previously described.

The cam shaft 101 extends through the switch housing 15 and supports a lever 46b which is rotatable with respect to the shaft 101. A disc 116 is keyed to the shaft 101 and is provided with a rearwardly bent tab 117 which is received in an arcuate slot 118 provided in the lever 46b. Movement of the disc is limited by the tab 117 in the slot 118. The disc 116 is biased in counter-clockwise direction by a helical spring 120 urging the tab 117 into engagement with the bottom of the slot 118.

A Y-shaped lever 122 is pivotally mounted on the housing 15 and is biased clockwise into abutment with a stop pin 123 by a spring 124. The lever 122 has a finger 125 which (with the lever at rest in the position shown) is disposed in the path of travel of the tab 117. The lever 122 is also provided with a rearwardly bent tab 128 disposed in the path of travel of lever 46b. The remaining linkage structure is substantially the same as described in connection with the first embodiment and functions in the same manner.

With the preheat switch 84 latched in the "on" position, as shown in Fig. 5, the heating elements 75 and 76 are connected in parallel through line terminals 78 and 80 across wire $L_1$—$L_2$, in maximum watt output arrangement.

Upon automatic release of the detent 62 by the expansive force of the diaphragm 44, as previously explained, the spring 50 will rotate the lever 46b counter-clockwise. The disc 116 will be rotated counter-clockwise by the spring 120 until, as shown in Fig. 6, its travel is momentarily interrupted by abutment of the tab 117 on the finger 126. The cam 100 will assume a corresponding position in which the intermediate cam portion 105 is in registry with the follower 102, allowing the contact arms 91, 92 and 93 to move to the open circuit position previously described, in which all circuits to the heating elements 75 and 76 are momentarily interrupted, and arcing at the contacts 88, 89 and 90 caused by the interruption of current is extinguished.

The lever 46b will continue to move counterclockwise, alone, to the position shown in Fig. 7, while the cam 100 "dwells" in the open-circuit position. The arcuate slot 118 will advance with relation to the tab 117.

Shortly before the end of its travel, the lever 46b will strike the tab 128 as shown in Fig. 7 and will rotate the lever 122 counterclockwise. The finger 126 is accordingly moved out of the path of travel of the tab 117, thereby permitting the tab 117 to move to the bottom of the slot 118 to complete its travel. The cam 100 is turned counterclockwise to the position shown in Fig. 8, in which the minimum throw portion 104 registers with the cam follower 102 and permits the contact arms to move to their extreme left position to connect the heating elements to the power supply through the selector switch 77.

The preheat period is thus terminated and the wattage output of the surface unit is reduced to a preselected wattage in accordance with the preselected setting of the selector switch 77, for example, the "simmer" position. Referring to Figs. 5 and 8 jointly, the "simmer" circuit is traced from wire $L_2$ to terminal 80, through switch arm 96 to terminal 83, through contact 90, through switch arm 93, through the heating element 76 to junction 75a, through the heating element 75 to switch arm 92, across contact 89 to terminal 82, through the switch arm 96 to terminal 79 to the wire N.

The manual operation of the control mechanism 74 is the same as that of the control mechanism 10. Accordingly, the preheat period is inaugurated by rotating the knob 30 from "off" to "simmer" in counterclockwise direction, and the selector switch may be set to other heat positions, without disturbing the preheat setting, by further counterclockwise rotation of the knob. The preheat switch 84 may be manually tripped to open-circuit position, if desired, at any time, by rotating the knob 30 clockwise through "simmer" to "off." Also, if preheating is not desired, the heating elements may be connected to the power supply through the selector switch by rotating the knob 30 in clockwise direction from "off" to the desired setting.

*Figs. 11 and 12*

Figs. 11 and 12 illustrate a fourth embodiment of the invention incorporated in a control mechanism 130 having an adjustable time controlled preheat period. The internal switching arrangement of the control 130 is similar to that of the control 10 and includes the cycling switch 14 and the preheat switch 34, described in connection with the control 10. The electrical circuits are also similar to those of the control 10.

The preheat period is a manually selected, timed function. Accordingly, the preheat switch shaft 41 is connected to a timer 133. The timer is shown in outline only, since it may be of any known spring-wound type having a ratchet and pawl to hold the spring in wound position. An L-shaped lever 46c is keyed to the shaft 41. A second lever 52c is pivotally mounted on the lever 46c and is biased in clockwise direction by a helical spring 55c against a forwardly bent stop lug 54c.

The switch shaft 28 has keyed thereon a lever 56c having an arm 134 of a length to abut a pin 57c disposed on the lever 52c.

A switch 136 mounted on the upper portion of the control serves as a line switch and, when in the "open" position, interrupts the flow of current to the surface unit 12, regardless of the setting of the preheat switch 34. The switch 136 is provided with a stationary contact 137 and a movable contact 138 carried by a spring arm 140 biased downwardly in circuit-closing direction and carrying a depending finger 142. The finger 142 has its lower end portion bent rearwardly to form a tab 143 disposed in the arc of travel of a finger 144 provided on the lever 56c. The spring arm 140 is connected to wire $L_1$. The stationary contact 137 is carried by a current conducting member 146 which is connected to one side of the heating unit 12. Contacts 16 and 38 are connected to wire $L_2$ by a conductor 147.

An additional set of stationary indicia 149 is provided adjacent the indicia 32. The set of indicia 149 represents time in minutes and is arranged in ascending order in counterclockwise direction commencing with "Off."

*Operation—Figs. 11 and 12*

Although, in the illustrated embodiment, the timed preheat period may be varied as desired from zero to 10 minutes, it will be assumed, by way of example, that it is desired to set the preheat switch 34 for a six-minute preheat cycle, and the cycling switch 14 to "low."

The knob 30 is first rotated counterclockwise until the reference dart comes into registry with the indicium "6" and then clockwise to a position in which the reference dart is disposed in registry with the "low" indicium. The counterclockwise rotation of the knob will move the lever 56c counterclockwise from the position shown in Fig. 11 through an arc corresponding to the angular displacement of the indicium "6" and cause the arm 134 to abut the pin 57c and rotate the lever 46c clockwise. The shaft 41 will be rotated clockwise, causing the cam 40 to engage the preheat switch contacts 36 and 38. The rotative effect of the shaft 41 will also wind the timer 133 an amount sufficient to keep the contacts 36 and 38 in engagement for six minutes. The finger 144 is also moved out of abutment with the tab 143, permitting the line switch 136 to complete the circuit through the surface heating unit and the preheat switch 34, in the manner described in connection with the control 10.

The clockwise rotation of the knob 30 will cause the finger 144 (in passing) to strike the tab 143, thereby lifting the finger 142 and momentarily moving the line switch 136 to its open-circuit position; but the brief opening of the switch 136 has no material effect on the preheat period. When adjusted to the "low" setting, the cam 22 will position the adjustable contact 16 in the proper relation to the cycling contact 18 to regulate the "on"

and "off" cycle of the cycling switch 14 as previously explained.

At the end of six minutes, the timer 133 will act to rotate the shaft 41 counterclockwise to its original position and the cam 40 will permit the movable contact 38 to disengage the contact 36, thereby terminating the preheat period. Thereafter, the cycling switch 14 will be effective to cyclingly control the wattage output of the surface unit 12 indefinitely or until it is desired to terminate the cooking process. To terminate the cooking process, the knob is rotated in either direction to the "off" position, thereby open circuiting the line switch 136 and the heating unit. Although, in rotating the knob clockwise to "off" to terminate the cooking process, the arm 134 will strike the pin 57c in passing, the timer 133 is undisturbed, since the spring 55c will yield and permit the lever to move out of the way of the arm 134.

If it is desired to set the control 130 for the maximum or 10 minute preheat period, the knob 30 may be rotated counterclockwise from off to the simmer, or any other desired higher temperature setting, without moving the knob in both directions.

If desired, the timed preheat period may be omitted, by rotating the knob 30 clockwise from the position shown in Fig. 11 to the desired setting, thereby connecting the surface unit to the power supply $L_1$—$L_2$ through the cycling switch 14.

In the embodiments shown in Figs. 1 through 10, inclusive, temperature-responsive means are utilized to terminate the preheat cycle, while in the embodiment shown in Figs. 11 and 12, time-responsive means are utilized for terminating the preheat cycle. However, it is to be understood that the embodiments shown and described in the specification may be modified as desired to utilize either time or temperature-responsive means for terminating the preheat cycle. Accordingly, the term "condition-responsive means," as utilized in the following claims, is intended to include time-responsive means and temperature-responsive means.

While I have shown my invention in several forms, it will be obvious to those skilled in the art that it is not so limited, but is susceptible of various other changes and modifications without departing from the spirit thereof.

What I claim is:

1. A control mechanism for controlling the supply of electrical energy to an electrical heating means and comprising a first switch adjustable to a plurality of positions including an "on" position and "off" for varying the supply of energy to said heating means, a second switch having one position for connecting said heating means to said energy supply in maximum energy receiving relation, and means operatively associated with said first switch for positioning said second switch, said last mentioned means including a rotatable shaft and an actuating member mounted thereon, said shaft being rotatable from the "off" position in either direction to adjust said first switch to said "on" position, latching means including a movable latch for holding said second switch in said one position, said member being movable by rotation of said shaft in one direction to actuate said second switch to said one position, said member being ineffective to actuate said second switch to said one position upon rotation of said shaft in the opposite direction, condition-responsive means effective to move said latch and release said second switch for movement from said one position when a prescribed condition is attained, and means actuated by said member by rotation of said shaft in said opposite direction from said "on" position to said "off" position for moving said latch to release said second switch.

2. A control mechanism, for controlling the supply of electrical energy to an electrical heating unit, including a first switch having a rotatable actuating shaft and adjustable by rotation of said shaft in either direction from an "off" position to a plurality of "on" positions to vary the average wattage input to the heating unit in accordance with the position of said shaft, a second switch adjustable from an "off" position to an "on" position to connect the heating unit in maximum wattage relation with the energy supply, means including an actuating member operable by rotation of said shaft in one direction to adjust said second switch to said "on" position, latching means including a movable latch for holding said second switch in said "on" position, said shaft being effective when rotated in said one direction to any one of said "on" positions, to actuate said first and second switches and, when rotated in the opposite direction to said one of said "on" positions, to actuate said first switch alone, condition-responsive means effective to move said latch to release said second switch for movement to the "off" position when a prescribed condition is attained, and means actuated by said member by rotation of said shaft in said opposite direction from any of said "on" positions to said "off" position for moving said latch to release said second switch.

3. A control mechanism for controlling the supply of electrical energy to an electrical heating element, including a two-position switch having an "on" position and an "off" position, a multiple-position switch having an "off" position and a plurality of "on" positions for selecting the average wattage input to said element, means including a rotatable shaft for adjusting said switches, said multiple-position switch being adjustable from its "off" position to any one of said plurality of "on" positions by rotation of said shaft in either direction, a spring biasing said two-position switch toward the "off" position, said two-position switch including a movable detent, a latch engageable with said detent for holding said two-position switch in the "on" position against said bias, an actuating member carried by said shaft and operable thereby when rotated in one direction, while adjusting said multiple-position switch from "off" to a selected "on" position, to adjust said two position switch to said "on" position, said two-position switch being effective when in said "on" position to control the energization of said heating element, said actuating member being operable by rotation of said shaft in the opposite direction, while adjusting said multiple-position switch from said selected "on" position to its "off" position, to trip said latch out of engagement with said detent, said multiple-position switch being effective to control the supply of energy when said two-position switch is in the "off" position, and condition responsive means for automatically tripping said latch, thereby transferring control to said multiple position switch, said actuating member being ineffective to adjust said two-position switch to said "on" position upon rotation of said shaft from its "off" position in said opposite direction.

4. A control mechanism for controlling the supply of electrical energy to a heating means, comprising a first switch having a rotatable shaft and adjustable by rotation of said shaft in either direction to vary the supply of energy to said heating means from "off" to maximum, a second or preheat switch for independently connecting said energy supply to said heating means in maximum energy receiving relation, and means operatively associated with said first switch for positioning said second switch, said means including a lever movable by said shaft in one direction to actuate said second switch, said shaft being thereby effective, when rotated in said one direction, to move said first and second switches to "on" and when rotated in the opposite direction to adjust said first switch alone to any "on" position, and condition responsive means effective to move said second switch to its "off" position when a prescribed condition is attained.

5. The structure recited in claim 4 in which said control switch has an "off" position, and means including an arm fixedly attached to said shaft for opening the circuit through said second or preheat switch independently of said condition responsive means when said shaft is rotated in either direction to said "off" position.

6. In an electrically heated cooking device, the combination of electrical heating means for heating the cooking vessel, means for supplying electrical energy to said heating means, said means including two wires of opposite polarity and a neutral wire, and a control for controlling the supply of electrical energy to said heating means, said control comprising a circuit selecting switch for varying the supply of energy to said heating means and adjustable in a plurality of fixed steps from maximum to "off," a second switch for independently connecting said energy supply to said heating means in maximum energy receiving relation, and means operatively associated with said circuit selecting switch for positioning said second switch including a rotatable shaft and a lever, said second switch having a first set of contacts connected to said two wires, a second set of contacts connected to said selecting switch and a set of movable contacts connected to said heating means, said lever being movable by rotation of said shaft in one direction to move said movable contacts into engagement with said first set of contacts to thereby connect said heating means across said two wires of opposite polarity independently of said selecting switch, said shaft being movable in the opposite direction to actuate said selecting switch alone, condition responsive means effective to move said movable contacts into engagement with said second set of contacts thereby transferring the control from the second switch to the multiple switch when a prescribed condition is attained, and means including a cam having a first portion for moving said movable contacts out of engagement with said first set of contacts to an open position and a second portion for moving said movable contacts from said open position into engagement with said second set of contacts to introduce a momentary time delay during transfer of control from the second switch to the selecting switch, said time delay being effected to minimize arcing within the control switch during such transfer.

7. A control mechanism for controlling the supply of electrical energy to an electrical heating element, including a first switch having a rotatable actuating shaft and adjustable to vary the wattage of the heating element in accordance with the position of said shaft, a second switch adjustable from an "off" position to an "on" position to connect the heating element in maximum wattage relation with the energy supply, timing means for controlling the "on" period of said second switch, means including a lever operable by rotation of said shaft in one direction to conjointly adjust said second switch to said "on" position and to condition said timing means, said timing means thereby being rendered effective to adjust said second switch to said "off" position at the end of a prescribed period of time, said first switch assuming control when said second switch is in the "off" position, rotation of said shaft in the opposite direction being ineffective to actuate said second switch, whereby said first switch may be actuated without actuating said timing means by rotation of said shaft in said opposite direction.

8. A control mechanism for controlling the supply of electrical energy to a plurality of electrical heating elements, including a multiple position switch having an "off" position and a plurality of "on" positions ranging from a low wattage position to a maximum wattage position, and a two-position preheat switch having a set of movable contacts connectible to said heating unit, a first or preheat set of stationary contacts connectible to said supply and a second or normal set of stationary contacts connected to said multiple position switch, an actuating member for moving said movable contacts into engagement with said preheat contacts to connect said heating unit directly to the electrical supply and for moving said movable contacts into engagement with said normal contacts to connect said heating elements to the electrical supply through said multiple position switch, a spring for biasing said actuating member in a direction to urge said movable contacts into engagement with said normal contacts and a latch for holding said actuating member against the action of said bias whereby said movable contacts are held in engagement with said preheat contacts, means including a rotatable shaft and a knob for adjusting said switches, said means further including a second actuating member carried by said shaft and movable in one direction to move said first actuating member against said bias whereby said movable contacts are moved into engagement with said first or preheat contacts when said knob is rotated from the "off" position to said low wattage position, said second actuating member being movable in the opposite direction to trip said latch when said knob is rotated from said low wattage position to said "off" position, and thermostatic means for automatically tripping said latch at a predetermined temperature independently of said second actuating member.

9. A control mechanism for controlling the supply of electrical energy to a plurality of electrical heating elements, including a multiple position switch having an "off" position and a plurality of "on" positions and serving to connect said heating elements so said supply in a plurality of circuit arrangements including a low wattage position and a maximum wattage position, and a two-position preheat switch having a set of contacts connectible to said heating elements and movable to a first or preheat position to connect said heating elements directly to the electrical supply in maximum wattage relation and movable to a second or normal position to connect said heating elements to the electrical supply through said multiple position switch, a cam for moving said contacts to either said preheat or said normal position, said cam also having an intermediate portion for moving said contacts to an intermediate position between said preheat and normal positions, a spring biasing said cam in the direction to move said contacts into said normal position and a latch for holding said cam in said preheat position against said bias, means including a rotatable shaft and a knob for adjusting said switches, said means further including an actuating member (56) carried by said shaft and movable in one direction to move said cam to said preheat position and movable in the opposite direction to trip said latch, thermostatic means for automatically tripping said latch, a lever (116) for actuating said cam, and means for momentarily maintaining said contacts in said intermediate position after said latch is tripped, to reduce arcing at said contacts, said last-mentioned means including a movable member (122) disposed in the path of travel of said lever and momentarily arresting the same and a rotatable arm (46b) comprising one member of the latch and controlling the movement of said lever, said arm moving said movable member out of the path of travel of said lever after said arm has rotated through a portion of its travel.

10. A control mechanism for controlling the supply of electrical energy to a heating device, comprising a first switch having a rotatable shaft for varying the supply of energy to said heating device from maximum to "off," a second switch having a set of contacts connectible to said heating device and movable to a first or preheat position to connect said device to said energy supply in maximum energy receiving relation independently of said first switch, and movable to a second or normal position in which said device is connected to said supply through said first switch, and means operatively associated with said first switch for positioning said second switch, said means including a rotatable lever (46) carried by said second switch for actuating said contacts, said lever being biased toward said normal position, a latch member for holding said lever in said preheat position against said bias, an actuating member (56) carried by said shaft and movable therewith, an arm pivoted to said lever and locked against rotation relative thereto in one direction but rotatable relative thereto in the opposite direction, said arm being disposed in the path of travel of said actuating member and being engageable and rotatable in said one direction by said actuating member to move said lever into engagement with said latch member, said arm having a portion adapted to abut said latch member to release said lever when said arm is rotated in said opposite direction.

11. The structure recited in claim 10 in which said actuating member has a finger portion, said structure further being provided with an intermediate lever having an upper portion disposed in the path of travel of said finger and a lower portion disposed in the path of travel of said arm, said finger abutting and rocking said intermediate lever, when said actuating member is rotated to the "off" position, and moving said lower portion into engagement with said arm and moving the latter into tripping engagement with said latch.

12. A control mechanism for controlling the supply of electrical energy to an electrical heating element, including a two-position switch having an "on" position and an "off" position, a multiple-position switch having an "off" position and a plurality of "on" positions including a low wattage position, means including a knob for adjusting said switches, said multiple-position switch being rendered ineffective to control the supply of energy while said two-position switch is in the "on" position, said multiple-position switch having a rotatable shaft carrying said knob and movable by said knob from "off" in either direction to anyone of said plurality of "on" positions, a first means including a rotatable shaft for actuating said two-position switch to the "on" position, condition-responsive means for returning said two-position switch to the "off" position, said first means including a first lever (46) fixed to said two-position switch shaft, a second lever (52) pivotally mounted on said first lever (46) and locked in one direction for joint rotation with said first lever (46) but yieldable in the opposite direction for rotation relative to said first lever, an actuating member (56) fixed to said multiple-position switch shaft and movable in said one direction, by rotation of said knob from "off" to the low wattage position, to engage and move said second lever (52), whereby said two-position switch is actuated to the "on" position, said actuating member (56) being rotatable in said opposite direction from the low wattage position to "off," said second lever (52) yielding upon engagement by said actuating member to permit such movement.

13. A control mechanism for controlling the supply of electrical energy to a heating means, comprising a two-position preheat switch having a set of contacts connectible to said heating means and movable to a first or preheat position to connect said heating means directly to an electrical supply at one voltage for maximum heat output and movable to a second position to connect said heating means to the electrical supply at a second voltage, a cam for moving said contacts to either said preheat or said second position, said cam having a portion for moving said contacts to an intermediate position between said preheat and second positions, a spring biasing said cam in the direction to move said contacts into said second position and a latch for holding said cam in said preheat position against said bias, actuating means including a manually adjustable knob for moving said cam to said preheat position, condition responsive means for automatically tripping said latch, and means for momentarily maintaining said contacts in said intermediate position after said latch is tripped to reduce arcing at said contacts, said last mentioned means including a movable member disposed to interfere with movement of said cam when said contacts are in said intermediate position and means operative in response to tripping of said latch to cause said interfering member to release said cam for movement of said contacts to said second position after a period of dwell in said intermediate position.

14. A control mechanism for controlling the supply of electrical energy to a heating means, comprising a first switch adjustable to vary the supply of energy to said heating means, a manually adjustable knob for adjusting said first switch, a two-position preheat switch having a set of contacts connectible to said heating means and movable to a first or preheat position to connect said heating means directly to an electrical supply for maximum heat output and movable to a second or normal position to connect said heating means to the electrical supply through said first switch, a cam for moving said contacts to either said preheat or said normal position, said cam having a portion for moving said contacts to an intermediate position between said preheat and normal positions, a spring biasing said cam in the direction to move said contacts into said normal position and a latch for holding said cam in said preheat position against said bias, actuating means connected to said knob for moving said cam to said preheat position, condition responsive means for automatically tripping said latch, and means for momentarily maintaining said contacts in said intermediate position after said latch is tripped to reduce arcing at said contacts, said last mentioned means including a movable member disposed to interfere with movement of said cam when said contacts are in said intermediate position and a movable member actuated in response to tripping of said latch and engageable with said interfering member to release said cam for movement of said contacts to said normal position after a period of dwell in said intermediate position.

References Cited in the file of this patent
UNITED STATES PATENTS

| | | |
|---|---|---|
| 2,207,870 | Myers | July 16, 1940 |
| 2,210,947 | Myers et al. | Aug. 13, 1940 |
| 2,363,326 | Hodgkins | Nov. 21, 1944 |
| 2,385,433 | Weber | Sept. 25, 1945 |
| 2,385,434 | Weber | Sept. 25, 1945 |
| 2,389,014 | Weber | Nov. 13, 1945 |
| 2,402,354 | Waddell | June 18, 1946 |
| 2,402,787 | Stickel | June 25, 1946 |
| 2,404,139 | McCormick | July 16, 1946 |
| 2,409,414 | Bletz | Oct. 15, 1946 |
| 2,410,014 | Clark | Oct. 29, 1946 |
| 2,435,530 | Candor | Feb. 3, 1948 |
| 2,541,314 | Weber et al. | Feb. 13, 1951 |
| 2,666,124 | Vogelsberg | Jan. 12, 1954 |